May 14, 1929. M. A. THORNE 1,712,855
BRAKE
Filed May 27, 1927 2 Sheets-Sheet 2

INVENTOR
Maurice A. Thorne
BY
ATTORNEY

Patented May 14, 1929.

1,712,855

UNITED STATES PATENT OFFICE.

MAURICE A. THORNE, OF SOUTH BEND, INDIANA, ASSIGNOR TO THE STUDEBAKER CORPORATION, OF SOUTH BEND, INDIANA, A CORPORATION OF NEW JERSEY.

BRAKE.

Application filed May 27, 1927. Serial No. 194,649.

This invention relates to vehicle brakes and particularly to the braking means therefor the principal object being to provide a vehicle brake with a braking means in which braking friction is employed as a brake applying force.

Another object is to provide a vehicle brake with a braking means in which the friction between a portion thereof and the drum is employed to apply braking force to the remainder of the same.

Another object is to provide a vehicle brake with a braking means having a rigid portion for a certain part of its length and a flexible portion for the remainder thereof.

Another object is to provide a vehicle brake with a braking means having a rigid primary portion and a flexible secondary portion integrally united, engagement of the primary portion with the drum expanding the integral secondary portion to engage the drum.

Another object is to provide a vehicle brake with a braking means of the self-energizing type comprising a split circular band which is rigid for a portion of its length and flexible for the remainder thereof.

Another object is to provide a vehicle brake with a braking means having a rigid primary portion, a flexible secondary portion integral therewith, and stops adjacent the free ends of the primary and secondary portions so that when the primary portion is moved by the drum to expand the secondary portion to engage the drum, one of the stops will prevent rotation of the secondary portion.

A further object is to provide a vehicle brake with a braking means of the self-energizing type comprising a split circular flexible band having a rigid reinforced portion extending substantially 120° of the length thereof, the braking friction of the reinforced portion with the drum being employed to expand the flexible portion thereof to engage the drum, and means to prevent rotation of the flexible portion.

These being among the objects of the present invention, the same consists of certain features of construction and combinations of parts to be hereinafter described with reference to the accompanying drawings and then claimed, having the above and other objects in view.

In the accompanying drawings, which illustrate a suitable embodiment of the present invention, Figure 1 is a section through the left front wheel of a motor vehicle taken on the line 1—1 of Figure 2, showing the brake construction, portions being broken away to better illustrate the same.

Figure 4 is a section taken on the line 4—4 of Figure 2, showing one of the brake operating arms.

Figure 5 is a section taken on the line 5—5 of Figure 2, showing one of the brake stop pins, also showing the shape of the reinforcing member.

Figure 1:
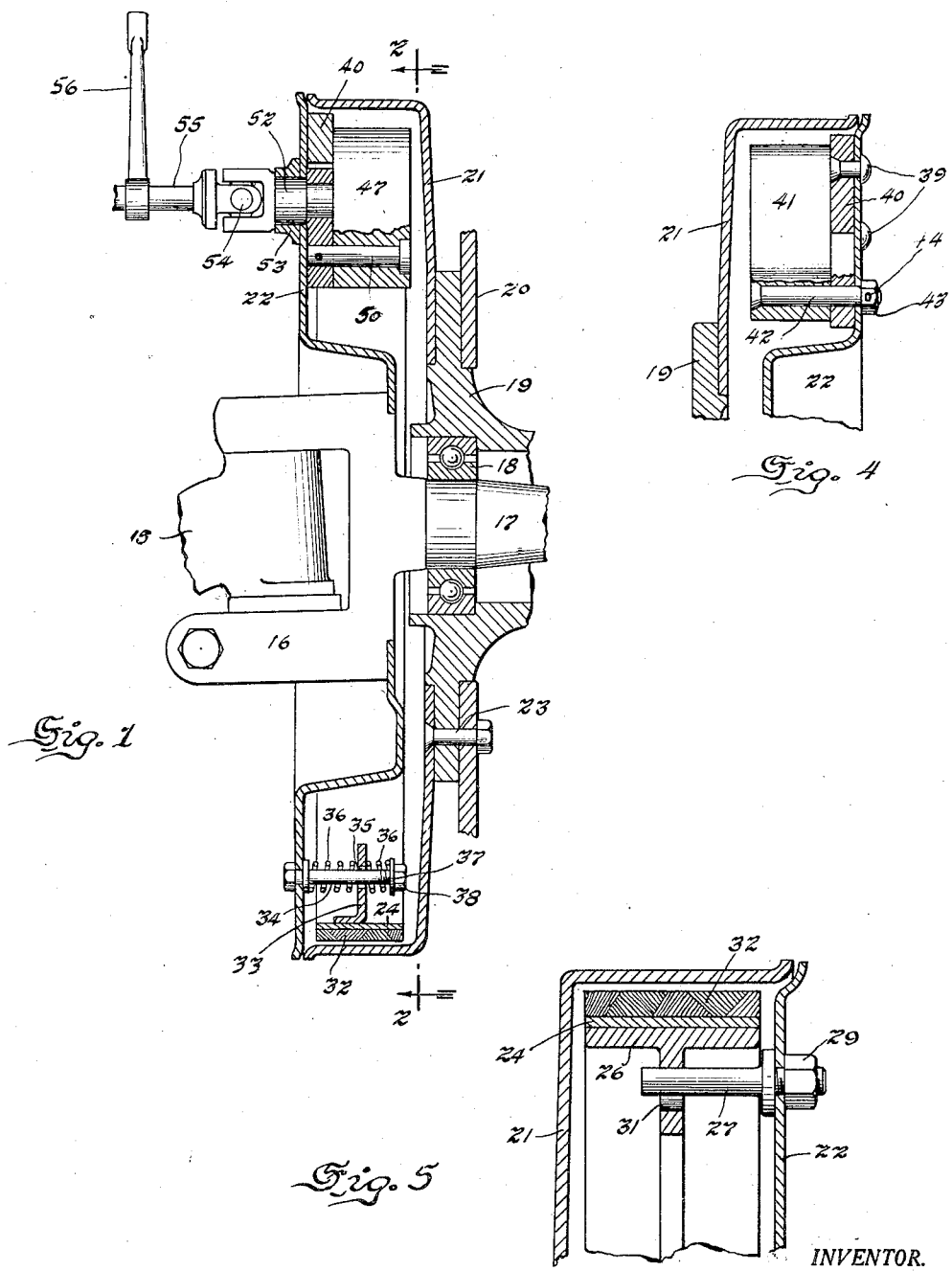
Figure 2:
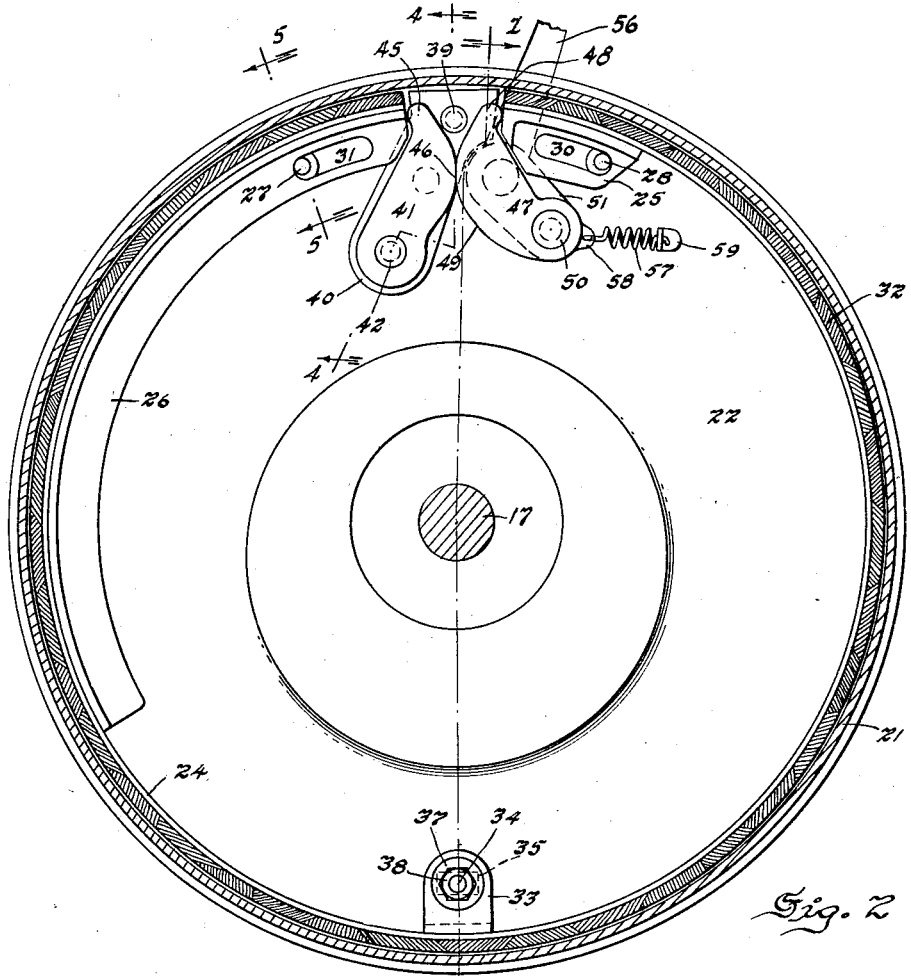
Figure 2 is a side section of the brake taken on the line 2—2 of Figure 1, showing the drum in section and the brake mechanism in inoperative position.

Referring to the accompanying drawings, in which like numerals refer to like parts throughout the several views, conventionally pivoted to a motor vehicle front axle 15 is a steering knuckle 16 having an outwardly extending stub axle 17 formed thereon. The axle 17 carries bearings 18 which rotatably support a wheel hub 19 to which a vehicle wheel 20 and a brake drum 21 are concentrically secured by bolts 23. A brake drum dust cover 22, which is also used as a brake support, is rigidly attached to the steering knuckle 16 in close relationship to the brake drum 21 to exclude as much dirt and the like as possible from the operating parts of the brake.

Concentrically arranged within the drum 21 is the brake engaging means which will be referred to in the following description as the brake. The brake comprises a split circular band 24 of thin-sectioned spring steel having a short bracket 25 secured to one end thereof and a rigid reinforcing bracket 26 secured to the other end thereof and extending therearound for approximately 120°. The bracket 26, as shown in section in Figure 5, is formed with a strengthening rib. The brake is suspended when in inoperative position on two stop pins, 27 and 28, secured to the dust cover 22 by nuts 29, the stop pin 28 extending through a slot 30 in the bracket 25 adjacent the end of the band 24 and the pin 27 extending through a similar slot 31 in the bracket 26 adjacent the opposite end of the band 24. The pins 27 and 28 are of less diameter than the width of the slots 30 and 31 so that the ends of the brake may be moved into engagement with the drum 21. A suitable friction facing 32 is attached by a conventional means to the band 24.

Secured to the band 24 directly opposite the ends thereof is a centering device, which prevents relative transverse displacement of the band 24 relative to the drum 21, comprising a bracket 33 secured to the band 24 and a bolt 34 secured to the dust cover 22 extending through a slot 35 in the bracket 33. Springs 36 are mounted on the bolt 34 at each side of the bracket 33 and are set in compression to bear against the bracket 33 by a washer 37 and a nut 38 threaded on the bolt 34. The springs 36 bear against the sides of the bracket 33 to keep the brake centered at all times in respect to the braking surface of the drum 21.

The operating mechanism per se for the brake forms no part of this invention and is subject matter for another application and will be described in this application only to show the operation of the brake. Any convenient method of expanding the ends of the brake may be used. Positioned between the ends of the brake and secured to the dust cover 22 by rivets 39 is a support 40 to which a brake engaging arm 41 is pivoted on a pin 42 secured thereto by a nut 43 and a locking key 44. The arm 41 is formed with a lip 45 which engages the end of the brake and with an elliptically shaped cam face 46. A similar arm 47, having a projecting lip 48 engaging the opposite end of the brake and an elliptically shaped cam face 49, is pivoted on a pin 50 to the end of a bell crank 51, the opposite end of which is secured to a rotatable shaft 52. The arms 41 and 47 are so positioned that when the lips 45 and 48, respectively, engage the ends of the brake, the cam faces 46 and 49 engage each other, each acting as a fulcrum point for the other, as will be described. A spring 57 is attached at one end to a bracket 59 secured to the dust cover and at the other end to a lug 58 formed on the end of the bell crank 51 to draw the same back to normal inoperative position after it has been moved to operative position.

The rotatable shaft 52 extends through the dust cover 22 and is journaled in a bracket 53 secured to the dust cover 22. The end of the shaft 52 extending through the bracket 53 is connected by a cross pin universal joint 54 to a shaft 55, which is rotated by a lever 56 to which braking force is applied by some means such as a brake pedal or lever.

Figure 3:
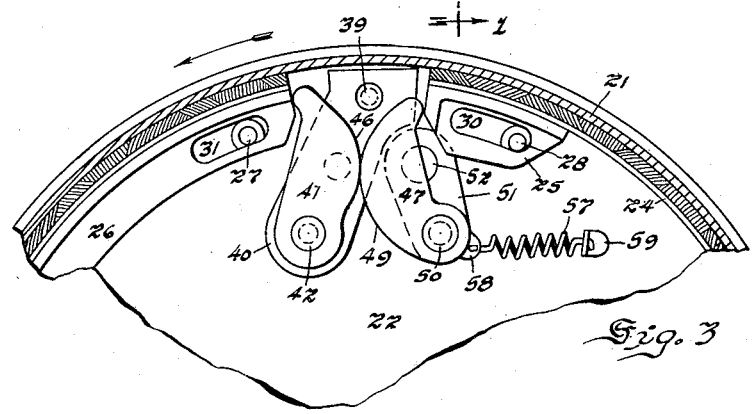
Figure 3 is a partial section similar to Figure 2, showing the operative position of the brake mechanism when the brake drum is rotated in a counterclockwise direction.

The operative position of the brake is shown in Figure 3 when the vehicle is moving forwardly, that is, when the brake drum is rotating in a counter-clockwise direction. The brake is applied by rotating the shaft 52 in a clockwise direction which swings the bell crank 51 to cause the arms 41 and 47 to pivot and expand the brake into initial engagement with the drum 21. The arm 47 pivots about its line of contact with the end of the brake as a fulcrum and because the cam surface 49 thereof contacts with the cam surface 46 of the arm 41, the arm 41 is pivoted about its pivot pin 42. When the brake facing 32 initially engages the brake drum 21, the brake is rotated until the stop pin 28 abuts against the end of the slot 30 to prevent further rotation of the same. Further rotation of the bell crank 51 pivots the arm 47 so that it swings the arm 41 against the adjacent end of the brake, which throws that portion of the band 24, having the rigid reinforced portion 26, previously called the primary portion, into complete engagement with the drum 21, the remainder of the band 24, or the secondary portion, in the meantime not being completely engaged with the drum 21. The primary portion of the band just described immediately assumes a self-energizing action and rotates with the brake drum 21, which, consequently being integrally connected with the secondary portion, expands the flexible secondary portion of the band 24 so that it completely engages the rotating drum 21 and retards the rotation thereof.

The action of the brake when the drum 21 is rotating in the opposite direction or clockwise is very similar with the exception that the stop pin 27 abuts against an end of its slot 31. The arm 41, which does not pivot in this case, acts as the fulcrum and the cam face 49 of the arm 47 slides thereover and exerts pressure in a circumferential direction against its adjacent end of the brake which expands the flexible secondary portion of the band 24 in a circumferential direction to engage the rotating drum 21.

Brake constructions used in the past usually had that objectionable feature which is commonly known as "chattering". This chattering usually occurs just as the brake is being applied when only the ends of the brake element are brought into contact with the rotating drum. The friction between the small area of friction material at the ends of the brake element and the drum is not constant and the end of the element rapidly engages and disengages the drum, hence the term "chattering". This causes uneven wearing of the friction surface of the brake element, and the rapid intermittent braking action annoys the occupants of the vehicle. The brake construction shown in the accompanying drawing eliminates all possibility of chattering, because of the large area of friction material which is brought into initial engagement with the rotating drum. All parts of the primary portion of the band 24, made rigid by the reinforcing bracket 25, evenly engage the drum 21 at the same time and thereby eliminate the possibility of a small area thereof engaging the drum to produce chattering.

Many other advantages over self-energizing constructions heretofore used are readily apparent. It can be seen that the construction embodying integral rigid primary and flexible portions is very simple, light in weight and can be economically constructed. It also eliminates the heavy, jointed, multiplicity of shoes so commonly used and is more efficient in operation than the same because of the wrapping action of the band.

Formal changes may be made in the specific embodiment of the invention described without departing from the spirit and substance of the broad invention, the scope of which is commensurate with the appended claims.

What I claim is:

1. In a brake mechanism, a rotatable drum, braking means therefor comprising a circular split band having a rigid primary portion and a flexible secondary portion, said primary portion engaging said drum to apply braking force to substantially all of said secondary portion.

2. In a brake mechanism, a rotatable drum, braking means therefor comprising integral rigid primary and flexible secondary portions, substantially all of said flexible portion being expanded to engage said drum by the frictional engagement of said primary portion with said drum.

3. In a brake mechanism, a rotatable drum, braking means therefor comprising a circular flexible split band having a rigid reinforcing member extending around a portion of the circumference thereof, and actuating means for engaging said reinforced portion of said band with said drum whereby movement of said reinforced portion with said drum forces substantially all of the flexible portion of said braking means to engage said drum to retard rotation thereof.

4. In a brake mechanism, a rotatable drum, a brake engageable therewith having integral rigid primary and flexible secondary portions, and means for moving said primary portion into engagement with said drum, said engagement of said primary portion with said drum expanding substantially all of said flexible secondary portion into frictional engagement with said drum.

5. In a brake mechanism, a rotatable drum, a brake engageable therewith comprising a split circular band rigid for approximately 120 degrees of its length and flexible for the remainder of its length, and means for moving said rigid portion of said band to engage said drum for limited rotation therewith, rotation of said rigid portion of said band expanding substantially all of the flexible portion thereof to contact with said drum to retard the rotation thereof.

6. In a brake mechanism, a rotatable drum, a brake engageable therewith comprising a split circular flexible band and a rigid reinforcing member secured thereto for approximately 120 degrees of its length, and means for moving the reinforced portion of said brake into contact with said drum, rotation of said portion causing substantially all of the flexible portion of said brake to expand to frictionally engage said drum.

7. In a brake mechanism, a rotatable drum, a brake therefor comprising integral rigid primary and flexible secondary portions, means for moving said rigid primary portion into contact with said drum to expand the major portion of said flexible secondary portion to frictionally engage said drum, and means to prevent rotation of said secondary portion.

8. In a brake mechanism, a rotatable drum, a brake engageable therewith having integral rigid and flexible portions, stops for the ends of said brake, and means for moving said rigid portion to engage said drum, movement of said portion with said drum expanding substantially all of said flexible portion to engage said drum, one of said stops preventing rotation of said flexible portion.

9. In a brake mechanism, a rotatable drum, a brake engageable therewith comprising a flexible band and a rigid member secured to the inner face thereof and extending for a portion of the length of said band, stops for the ends of said band to limit the movement thereof relative to said drum, and means for moving the rigid portion of said band into engagement with said drum, rotation of said rigid portion expanding substantially all of the flexible portion of said band to engage said drum.

10. In a brake mechanism, a rotatable drum, a brake engageable therewith having slots adjacent its ends, said brake comprising a split flexible circular band having a rigid reinforcing member secured to a portion of its length, fixed stop pins projecting through said slots, and means for moving said reinforced portion into engagement with said drum, rotation of said portion with said drum expanding substantially all of said flexible portion to engage said drum, an end of one of said slots in said brake abutting against its stop pin to prevent rotation of said flexible portion of said band.

11. In a brake mechanism, a rotatable drum, a support adjacent said drum, a floating brake comprising a circular flexible band having a rigid reinforcing member secured thereto for a portion of its length and having slots adjacent its ends, fixed stop pins mounted on said support extending through said slots, said pin in the slot in the flexible end of said band preventing rotation of said flexible portion relative to said drum, and means mounted on said support between the ends of said band for moving said reinforced portion of said band into engagement with said drum, the rotation of said reinforced portion expanding substantially all of the flexible portion of said band to engage said drum.

12. In a brake mechanism, a rotatable drum, braking means engageable therewith having a rigid portion and a flexible portion integral with said rigid portion, means between the ends of said braking means for moving said rigid portion, means to engage said drum, thereby expanding substantially all of said flexible portion to engage said drum and means for preventing rotation of said braking means.

13. In a brake mechanism, a rotatable drum, a split flexible circular band engageable therewith, means to cause even engagement of said band with said drum comprising a rigid reinforcing bracket secured to said band for substantially 120° of its length, and means for moving said reinforced portion of said band into contact with said drum to expand the remainder of said band in a circumferential direction to frictionally engage said drum.

Signed by me at South Bend, Indiana, this 24th day of May 1927.

MAURICE A. THORNE.

DISCLAIMER 1,712,855.—*Maurice A. Thorne*, South Bend, Ind. BRAKE. Patent dated May 14, 1929. Disclaimer filed December 1, 1930, by the assignee, *The Studebaker Corporation*.

By this disclaimer therefore restricts the scope or meaning of claims 1, 2, 3, 4 and 7 of the said patent to a brake structure having but a single continuous and uninterrupted flexible secondary portion of substantially greater length than the rigid primary portion of the brake.

[*Official Gazette December 16, 1930.*]